(12) United States Patent
Tsai et al.

(10) Patent No.: US 6,809,842 B1
(45) Date of Patent: Oct. 26, 2004

(54) APPARATUS FOR SCANNING DOCUMENT

(75) Inventors: Jenn-Tsair Tsai, Shin-Chu (TW);
Jone-Nun Chen, Taichung (TW);
I-Chang Lu, Shin-Chu (TW)

(73) Assignee: Mustek Systems Inc. (TW)

( * ) Notice: Subject to any disclaimer, the term of this patent is extended or adjusted under 35 U.S.C. 154(b) by 534 days.

(21) Appl. No.: 09/716,232

(22) Filed: Nov. 21, 2000

(51) Int. Cl.[7] ................................................. H04N 1/04
(52) U.S. Cl. ..................... 358/471; 358/474; 358/497; 358/494; 250/208.1; 250/235; 382/312
(58) Field of Search ............................... 250/208.1, 235; 358/474, 497, 471, 400, 505, 494; 382/312

(56) References Cited

U.S. PATENT DOCUMENTS 6,147,778 A * 11/2000 Yamada et al. ............. 358/474
6,489,602 B1 * 12/2002 Wang et al. ............. 250/208.1
6,587,231 B1 * 7/2003 Sung ........................... 358/497

* cited by examiner

Primary Examiner—Edward Coles
Assistant Examiner—Heather D Gibbs
(74) Attorney, Agent, or Firm—Lowe Hauptman Gilman & Berner, LLP

(57) ABSTRACT

The present invention provides an image scanning device having an upper housing and a lower housing. The upper hosing includes at least a scanning module for outputting digitalized image signals. Thus, a user can place a document facing up on a document plate and therefore be able to examine the wrinkles, alignment and inclination.

10 Claims, 4 Drawing Sheets

APPARATUS FOR SCANNING DOCUMENT

BACKGROUND OF THE INVENTION

1. Field of the Invention

The present invention generally relates to an improved image scanning device. During scanning processes, the document can be placed upwardly that the user can verify and align the placement of the document. If the document is inclined, the user can therefore adjust the document to match the requirement of the image scanning device and also the need of a user.

2. Background Description

Due to the issue of environment protection, recently the traditional paper documents have been requested to be converted into electric file format for archiving and transmitting purpose and need. The ideal non-paper office and home environment can therefore be achieved. In this case, image scanning devices are broadly employed in our world.

Generally, there are two kinds of documents. They are reflective documents and transparent documents. The reflective document is directed to a document which is non-transparent, such as an ordinary paper, a picture or a print. The transparent document is directed to a document which is able to let the light passing through, such as a film, a slide and the kind.

A traditional image scanning device is shown in FIGS. 1A and 1B. The traditional image scanning device 1 is employed to scan an ordinary reflective document in order to get the digitalized image of the document. The image scanning device comprises a lower housing 11 and an upper cover 12. The lower housing 11 includes at least an axis 111, a scanning module 112, a document plate 113 and the driving module 114. A user is needed to place a document 13 above the document plate 113 for further scanning. Especially, the document 13 is required to face down to the lower housing 11. The user is therefore to close the cover on the document 13. Once the document 13 is placed by facing down, the user is able to start the scanner driver program to scan, or to press a switch button, implemented on the scanner (not shown in the figures) to drive the image scanning device 1 for conducting a scan. When the image scanning device 1 is instructed by the user's action, the reflective document light source 1121 of the scanning module 112 is turned on to projecting a light to the document 13. The light is further reflected back to the scanning module 112 by the document 13. After the reflection provided by a reflection mirror 1123, the path of light is changed to pass lens 1124 and be formed on the image generating module 1122. generating module 1122. The image generating module 1122 therefore generates and output digitalized signals of the specific portion of the document.

Accordingly, the driving module 114 of the image scanning device 1 urges the scanning module 112 to the direction shown as an arrow legend, for completing whole scanning process.

In view of the above, the scanning page of the document is required to face down in order to complete the scan. In this case, it is inconvenient to the usage. For examples, if the document is larger than the document plate, the user has to adjust the position of the document many times to get a proper scanning result. This is for the reason that the user cannot see the pages of the document due to the document is facing down. Further, if the page of the document is inclined the OCR (Optical Character Recognition) software may not be able to precisely recognize the words shown in the inclined scanned page image. Therefore, the user would like to avoid the inclination of the document during the scanning processes. In traditional scanning devices, due to the document facing down, the user is hard to adjust the document to be aligned.

Another known scanning type of the image scanning device is shown in FIGS. 2A and 2B. The scanning device is directed to scan a transparent document. The lower housing 11 is the same as the lower housing shown in FIG. 1B. The upper cover 12 of the FIGS. 1A and 1B has been modified to an upper housing 14. The upper housing includes a transparent document light source 141 and the light source driving module 142. The transparent document light source 141 provides a light passing through the document 13. Then following the method described in FIG. 1B, the light is projected into the image generating module 1122. The image signals of the document is generated out as a digital form. Once a portion of the image of the document is generated, the driving module 114 drives the scanning module 112 along the direction shown by the arrow legend. At the meantime, the light source driving module 142 urges the light source 141 synchronously in order to scan the next portion of the document.

Regarding to the upper housing 14 of the above, there is a known model shown in FIG. 2C. The upper housing 14 includes a light propagating plate 143 and a plate light 144. The light propagating plate 143 can distribute the light equally to the whole area. The plate light provides the light to the plate for the distribution of the light. When the user conduct a scanning procedure, the light distributed by the plate would pass the transparent document and be projected on the image generating module 1122 as mentioned in the above as FIG. 1B. The image signals of the document is generated out as a digital form. Once a portion of the image of the document is generated, the driving module 114 drives the scanning module 112 along the direction shown by the arrow legend. Especially, the scanning module 112 employs the light distributed by the plate. There is no need to drive the plate light.

In view of the above, since the document is placed facing down, even when the user is able to see the page of a transparent document, the content (such as the words, pictures or incline degree) is mirrored. It is still not easy to adjust the document at the user's instinct. Moreover, it is hard to recognize the characters when the characters are mirrored by reversing left and right sides.

SUMMARY OF THE INVENTION

It is therefore an object of the present invention to provide an apparatus for scanning documents at users' convenience, particularly by scanning a facing up document. The user is therefore able to align the document by directly viewing the pages for further scanning when the document faces up. Thus, the user is able to precisely adjust the placement and the inclination of the document.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
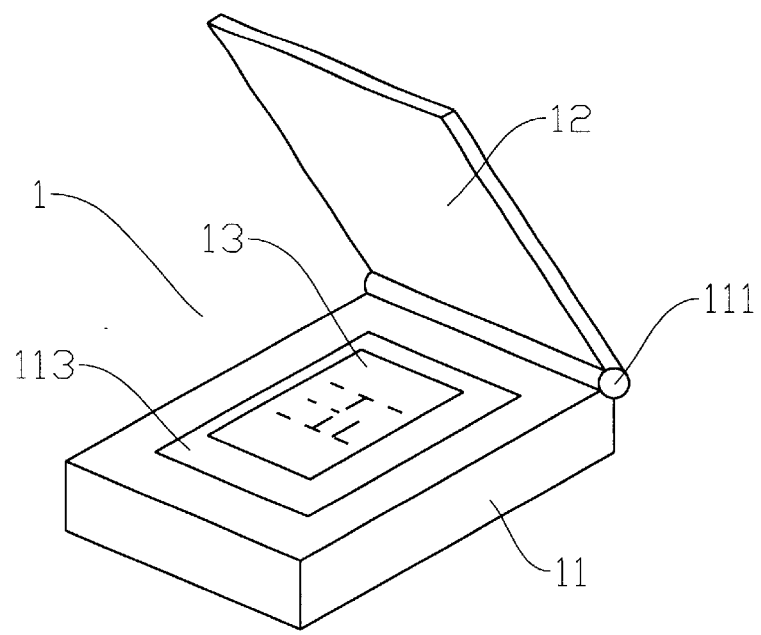
FIG. 1A is a schematic demonstration of a traditional scanning device.
Figure 1B:
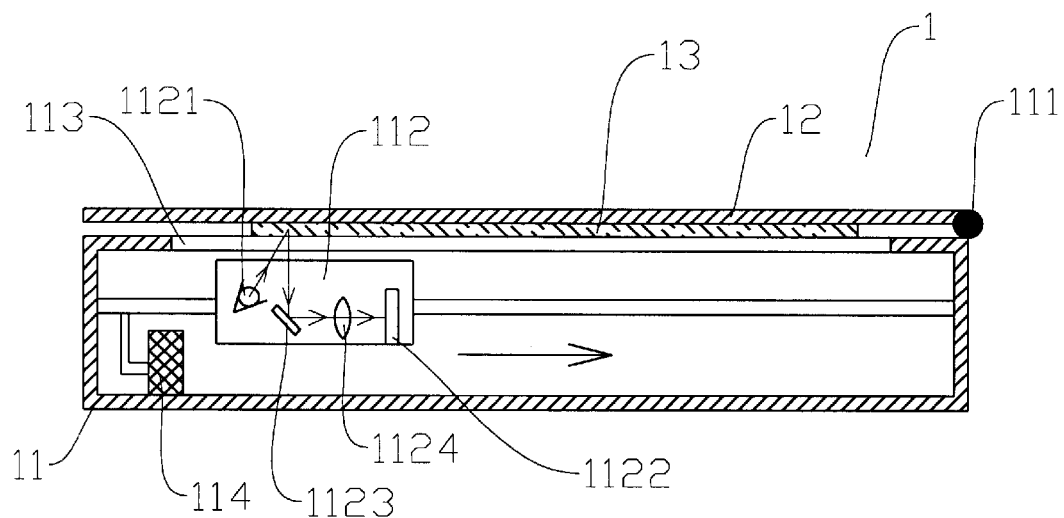
FIG. 1B shows the cross section of the traditional scanning device.
Figure 2A:
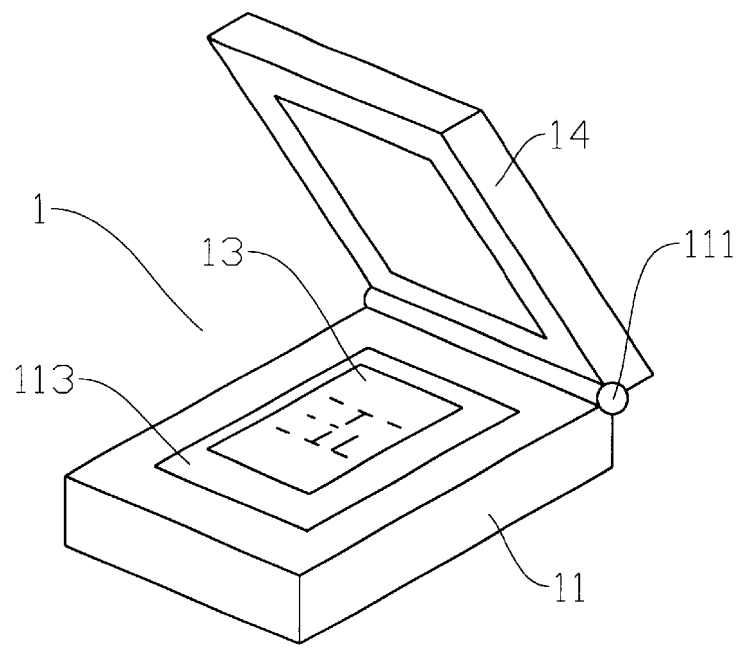
FIG. 2A is a schematic demonstration of another scanning device.
Figure 2B:
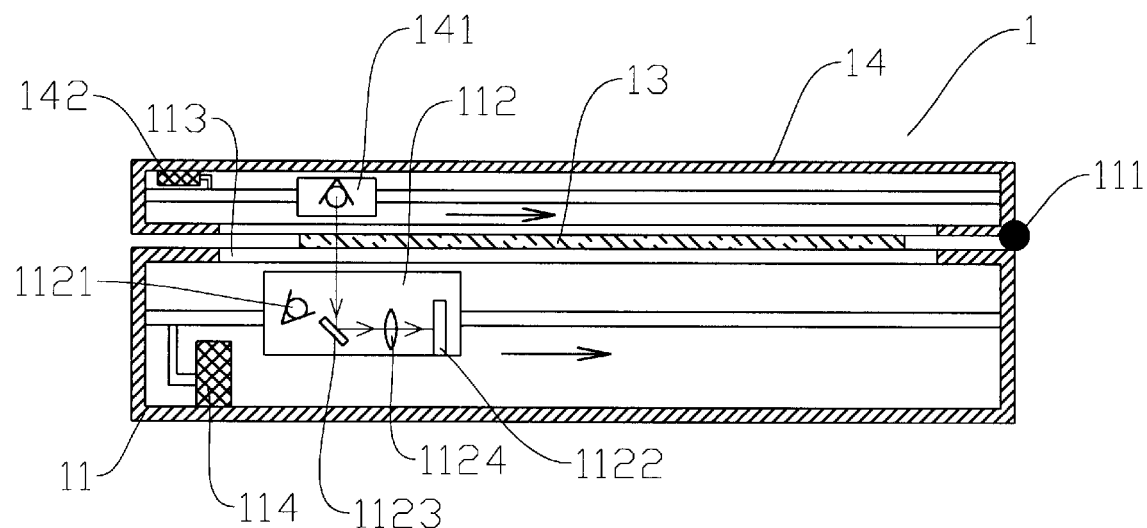
FIG. 2B is the cross section of the other scanning device during scanning a transparent document.
Figure 3A:
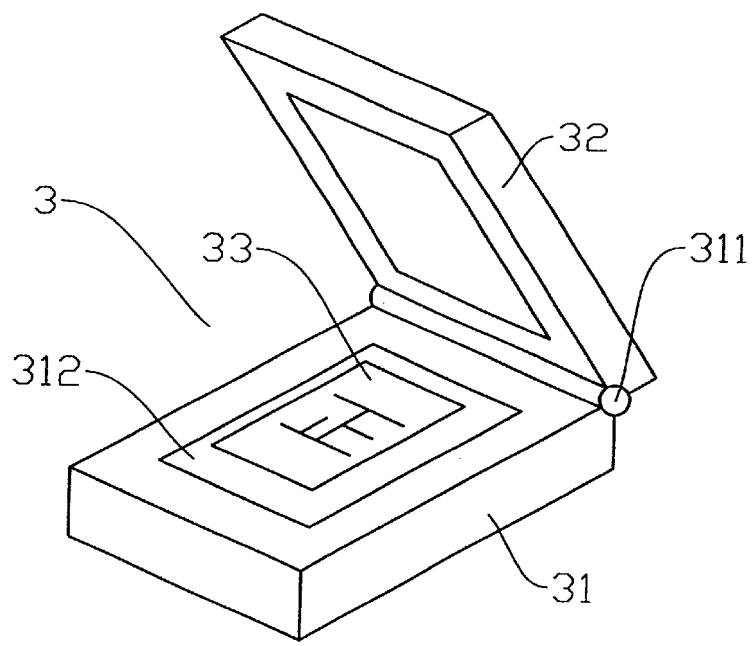
FIG. 3A shows the schematic demonstration of the present invention.
Figure 3B:
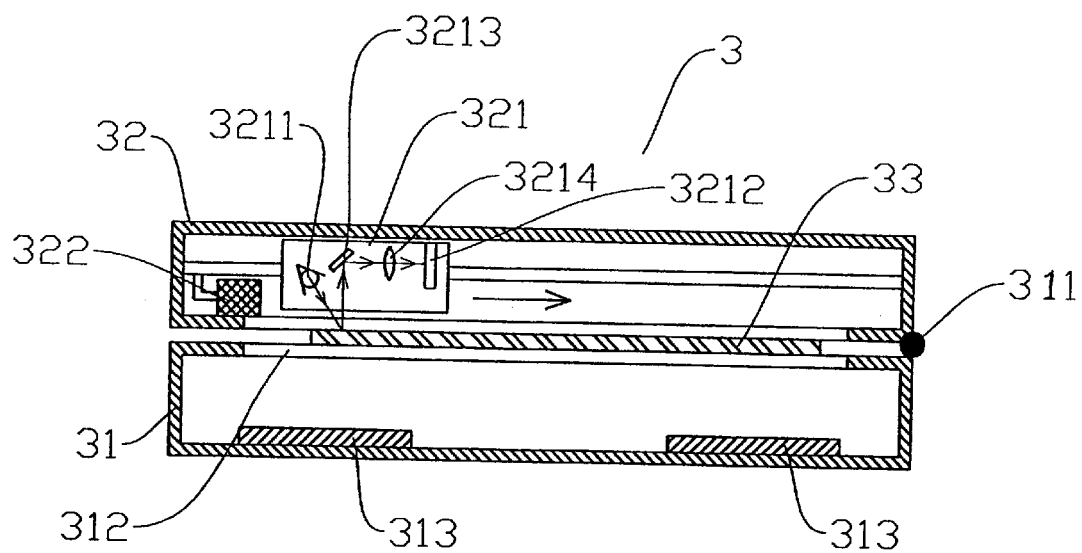
FIG. 3B is the cross section of the first embodiment of the present invention.

Please refer to FIGS. 3A and 3B for the first embodiment of the present invention. The first embodiment of the present invention is directed to a scanning device with improvement of scanning a reflective document. The scanning device at least includes a lower housing 31 and an upper housing 32. The upper housing 32 has an axle 311 for engaging the upper housing 32 to the lower housing 31. Thus, the upper housing can open or close the lower housing 31. The lower housing includes a document plate 312 which is positioned in the upper side of the lower housing 31. The document plate 312 is directed to be placed with a document. The upper housing 32 includes a light source 3211 projecting light for scanning purpose, an image generating device 3212 for generating digitalized image signals of the document, a reflection mirror 3213 and a lens 3214. The image generating device 3212 usually is a Charge Couple Device (CCD). The reflection mirror 3213 is directed to change the light path in order to match the placement of components implemented in the scanning device. The lens 3214 is directed to focus the optical image of the document 33 to the image generating device 3212. The upper housing further includes a driving module 322 for moving the scanning module 321 to proceed scanning procedures. For stability purpose, there is a weighted element 313 mounted inside the lower housing 31. The weighted element 313 can be metal material or material with heavy weight, such as Lead. In this case, it would be stable if the upper housing which contains many modules inside is opened. The lower housing would not be falling down if the upper housing is at open position.

In view of the above mentioned, when the user would like to scan a reflective document, the user can place the document on the document plate 312 and make the document 33 facing up. Then the user can check whether the document is smooth without any wrinkles on it, or the user can adjust the position of the document to determine which portion of the document should be scanned. Once the inspection is done, the user closes the upper housing 32 and starts a program to drive the scanning device 3 to conduct scanning procedures. In some models of the scanning devices, the user only needs to press a button implemented in the scanning device to start the scanning procedures. Once the scanning device 3 receives scanning instructions, the reflective document light source 3211 of the scanning module 321 will project a light to the document 33. The light is further reflected by the document 33 to the scanning modules. By the reflection mirror 3213, the light path is changed to pass through the lens 3214 and be focused on the image generating device 3212. The image generating device 3212 then generates digitalized image signals of the document. The driving module 322 advances the scanning module 321 to next position in order to completely scan predetermined area of the document.

Figure 3C:
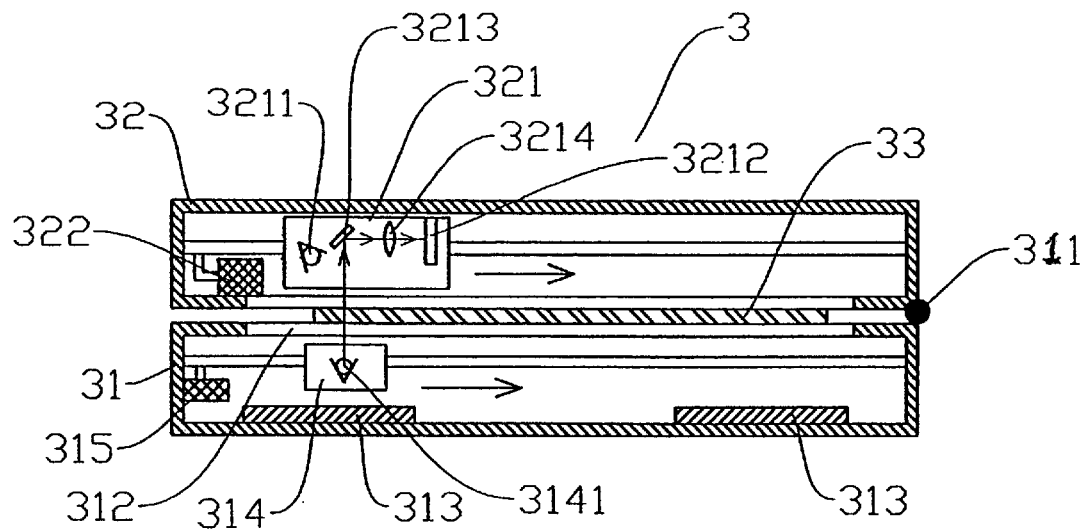
FIG. 3C is the cross section of the second embodiment of the present invention.

FIGS. 3C and 3B show the second embodiment of the present invention. FIG. 3C is the cross section of the second embodiment The second embodiment is directed to scan a transparent document. The lower housing 31 further includes transparent document light source 314 in the device 3141 for projecting a light passing through the transparent document, and a light source driving module 315 for moving the transparent document light source 314 that the light source 314 can move with the scanning module 321 synchronously.

According to the above description, when a user want to scan a transparent document 33, the user is able to place the document on the document plate 312 and make the transparent document 33 facing up. Thus, the user can visually examine the alignment of the transparent document 33 to adjust the position of the document and correct the inclination. After finishing the examination, the user close the upper housing 32 and start a program to begin the scanning procedures, or push a button implemented in the scanning device (not shown in the figures). Since the transparent document 33 is able to let the light pass through. The image scanning device will turn off the reflective document light source 3211 and turn on the transparent document light source 314. Thus, the light is projected from the transparent document light source 314 and passes through the transparent document 33. After passing through, the light is transmitted into the scanning module 321. By the reflection mirror 3213, the light path is changed to be focused on the image generating device 3212 by the help of lens 3214. In this case, the image generating device 3212 transforms the optical image of the document to digitalized image signals. Once the step is done, the light source driving module 315 will move the transparent document light source 314 along the direction of legend arrow, which is the synchronous movement as the scanning module 321, to completely conduct the scanning procedures.

Figure 3D:
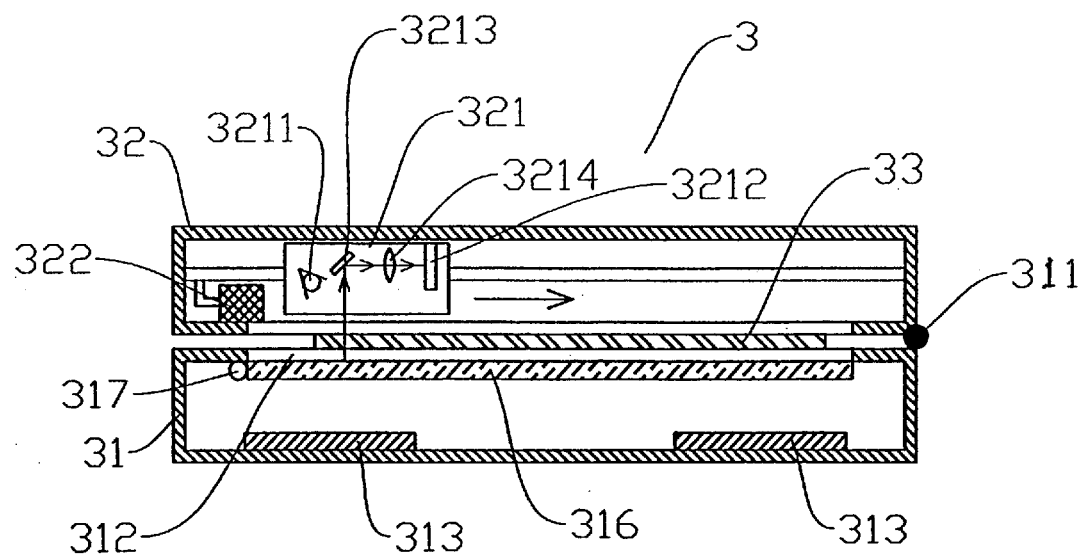
FIG. 3D is the cross section of the third embodiment of the present invention.

The third embodiment is shown as FIG. 3D. The third embodiment provides another improvement of the present invention. The third embodiment is directed to an apparatus for scanning a transparent document. The difference between the second embodiment and the third embodiment is the third embodiment employs a light plate 316 for distributing the light coming for the light source 317. The light plate 316 is positioned below the document plate 312 but still inside the lower housing 31. The purpose of the light plate 316 is to distribute the light from the light source 317 equally to the document plate.

In view of the above, when a user want to scan a transparent document 33, the user is able to place the document on the document plate 312 directly and make the transparent document 33 facing up. Please refer to FIG. 3A. Thus, the user can visually examine the wrinkles or alignment of the transparent document 33 to adjust the position of the document and correct the inclination. After finishing the examination, the user close the upper housing 32 and start a program to begin the scanning procedures, or push a button implemented in the scanning device (not shown in the figures). Since the transparent document 33 is able to let the light pass through. Since the document is transparent, the image scanning device will turn off the reflective document light source 3211 and turn on the light source 317. Thus, the light is equally distributed to the transparent document upwardly by the distribution help of the light plate 316 and passes through the transparent document 33. After passing through, the light is transmitted into the scanning module 321. By the reflection mirror 3213, the light path is changed to be focused on the image generating device 3212 by the help of lens 3214. In this case, the image generating device 3212 transforms the optical image of the document to digitalized image signals. Once the step is done, the light source driving module 315 will move the transparent document light source 314 along the direction of legend arrow, which is the synchronous movement as the scanning module 321, to completely conduct the scanning procedures.

Generally, the first, second and third embodiments of the present invention are all directed to document being placed facing up on a document plate. Because the document is faced up, the user can visually examine the wrinkles, alignment or inclination of the document before staring the scanning. In this case, it is convenient to user to do the scanning. Furthermore, in order to avoid the upper housing is heavy to cause stability problem to the image scanning device, the present invention place a heavy material to balance the weight of the upper housing and the lower housing.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. An image scanning device comprising:
   a lower housing, comprising a document plate, which is positioned at the top side of said lower housing for placing a document; and
   an upper housing, positioned above said lower housing, comprising
   a scanning module, positioned inside said upper housing for transforming an optical image to digitalized image signals, comprising at least:
   a reflective document light source for generating a light that does not pass through said lower housing to a reflective document:
   an image generating device for transforming said optical image of said document to digitalized image signals; and
   a lens, placed between said reflective document light source and said image generating device, for focusing said optical image onto said image generating device; and
   a driving module, positioned inside said upper housing for driving said scanning module to conduct the scanning.

2. The image scanning device of claim 1, said lower housing further comprising:
   a weight device for increasing the weight of said lower housing.

3. The image scanning device of claim 3, wherein said weight device is made by Lead.

4. The image scanning device of claim 1, said upper housing and said lower housing are engaged by an axle for closing and opening purposes.

5. An image scanning device comprising:
   a lower housing comprising:
   a document plate, which is positioned at the top side of said lower housing for placing a document;
   a transparent document light source for projecting a light in a nearly straight line to a transparent document without passing through any mirrors; and
   a light source driving module for moving said transparent document light source to conduct the scanning; and
   an upper housing, positioned above said lower housing, comprising
   a scanning module, positioned inside said upper housing for transforming an optical image to digitalized image signals, comprising:
   an image generating device for transforming said optical image of said document to digitalized image signals; and
   a lens for focusing said optical image onto said image generating device; and
   a driving module, positioned inside said upper housing for driving said scanning module synchronously with said light source driving module to conduct the scanning.

6. The image scanning device of claim 5, and lower housing further comprising: a weight device for increasing the weight of said lower housing.

7. The image scanning device of claim 6, wherein said weight device is made of lead.

8. An image scanning device comprising:
   a lower housing comprising:
   a document plate, which is positioned at the top side of said lower housing for placing a document:
   a light source for producing a light; and
   a light plate, positioned below said document plate for distributing said light equally to said document; and
   an upper housing, positioned above said lower housing, comprising
   a scanning module, positioned inside said upper housing for transforming an optical image to digitalized image signals; comprising:
   an image generating device for transforming said optical image of said document to digitalized image signals; and
   a lens for focusing said optical image onto said image generating device; and
   a driving module, positioned inside said upper housing for driving said scanning module to conduct the scanning.

9. The image scanning device of claim 8, said lower housing further comprising:
   a weight device for increasing the weight of said lower housing.

10. The image scanning device of claim 9, wherein said weight device is made of lead.

* * * * *